April 10, 1934.  G. K. E. H. STAMPE  1,954,395
METHOD AND APPARATUS FOR PURIFYING GASEOUS MIXTURES
Filed March 14, 1932
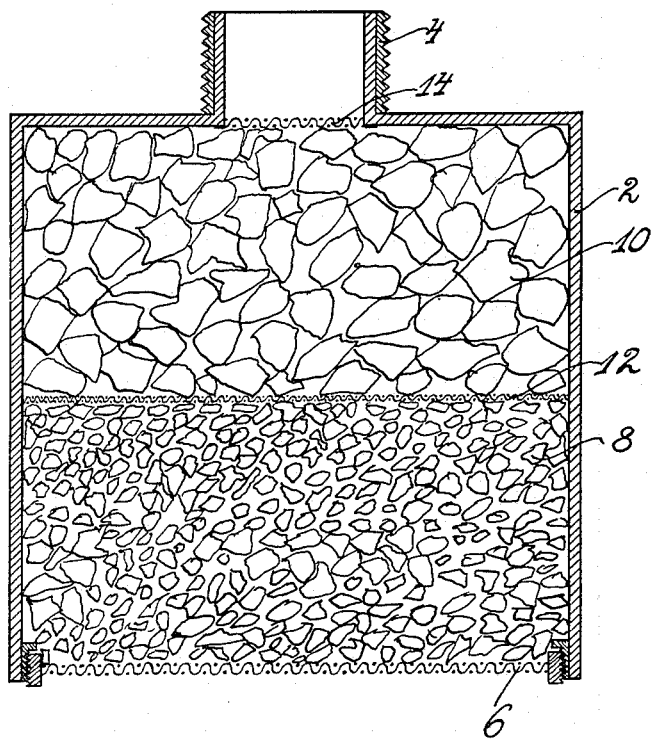
Inventor
Gerhard K.E.H.Stampe.
By
Attorney Patented Apr. 10, 1934

1,954,395

UNITED STATES PATENT OFFICE 1,954,395

METHOD AND APPARATUS FOR PURIFYING GASEOUS MIXTURES

Gerhard Karl Emil Heinrich Stampe, Lubeck, Germany, assignor to Bernhard Drager, Brasov, Rumania Application March 14, 1932, Serial No. 598,857
In Germany March 10, 1931

8 Claims. (Cl. 23—4)

I have filed an application in Germany on March 10, 1931.

This invention relates to a method, apparatus, and composition of matter, for purifying gaseous mixtures. More particularly, it relates to the purification of air containing ethylene oxide for breathing purposes.

The organic gas, ethylene oxide,

has been in use for a considerable number of years as a toxic material for the killing of insects. In the ordinary use of this poisonous gas, the ethylene oxide is mixed with carbon dioxide and the mixture is applied directly against the insect life. This mixture, known commercially as "T-gas", has always been very difficult for the workmen to handle safely in the gassing chambers. The carbonic acid gas, $CO_2$, of this mixture, of itself is not dangerous since it does not produce toxic effects in the human system. However, the ethylene oxide component is extremely toxic and is noxious and disagreeable to the user. It is essential that all persons who come in contact with this poisonous gas in any way be protected against its injurious effects. In the usual provisions for such protection, the workmen are protected by wearing gas masks, or the air is drawn through purifying devices to afford protection to the occupants of enclosed places in which the gas is used.

Unfortunately, no satisfactory method of protecting workers against the harmful effects of ethylene oxide has heretofore been devised. In former methods, activated carbon has been used in gas masks or air purifying apparatus to adsorb the toxic gas. When activated carbon is used, there is a tendency for some of the carbon present to react with the ethylene oxide molecule or to decompose the ethylene oxide, which results in the formation of carbon monoxide. Carbon monoxide is, of course, highly poisonous, and in addition possesses the quality of being practically odorless. The user of a gas mask or the occupants of a building protected by such methods would not be aware of this decomposition of the ethylene oxide since, in the absence of any noticeable odor, it would be believed that the apparatus was functioning successfully.

An object of the present invention is to provide an efficient and reliable method and apparatus for the purification of gaseous mixtures containing ethylene oxide. To accomplish this result, I change the ethylene oxide by means of materials which react chemically therewith to a more stable substance which is very readily adsorbed by carbon or similar materials but which is not decomposed by the adsorbing material. This is an important feature of my invention since, as I have previously pointed out, it is not possible to adsorb ethylene oxide in activated carbon without the danger of forming poisonous materials, which will escape from the purification apparatus and decrease the efficiency thereof.

My invention consists in a novel method and composition for the complete conversion of this toxic gas to an easily adsorbed substance which is not subject to decomposition under the conditions of use; thus other poisonous substances, which will not be adsorbed in the purification apparatus, cannot be formed. In my method, the ethylene oxide is first changed by means of a chemical reaction with suitable materials to a compound which is easily and completely adsorbed in the adsorbing medium, which may be activated carbon or the like. The product of the reaction between ethylene oxide and the chemically reactive materials is a chemical compound which will not undergo decomposition when in contact with activated carbon.

Another object of my invention resides in the provision of means for apprising the persons breathing the air that is purified that the adsorbing materials have become exhausted. In my method of purification, in which the ethylene oxide is chemically changed into a material that is more completely and more certainly adsorbed, the resulting substance possesses a much stronger and more noticeable odor than the ethylene dioxide itself. When the active adsorbing elements in the purification apparatus become exhausted, or reach the condition where they will not take up or remove all of the poison gases passing therethrough, the sharp and penetrating odor of the gas resulting from the chemical combination will become easily discernible to the persons using the air to be purified.

In the known methods of purifying air containing ethylene oxide, if any gas escapes because of the exhaustion or failure of the adsorbing activated carbon or for any other reason, this gas is generally the highly poisonous but practically odorless carbon monoxide or at most the only slightly odorous ethylene oxide. The occupants of the room or the wearer of the gas mask relying on this old method for protection will continue to work in the area containing the poisonous gas and will be totally unaware that their respiratory systems are being filled with a gas at least as poisonous as the ethylene oxide present in the unpurified air. Fatal or highly injurious effects may well result and no warning of any sort is ever given to the victims.

These and other features of the invention, and the novel method referred to, will be more fully apparent from the following specification when read in connection with the annexed drawing which forms a part thereof and will be particularly pointed out in the appended claims.

The drawing shows in cross section a canister for a gas mask embodying the invention.

Generally speaking, my invention consists in passing a gas containing the toxic ethylene oxide over a substance capable of yielding hydrochloric acid, so that the toxic material is converted into ethylene chlorhydrin, and then adsorbing the product by means of activated carbon or the like.

According to my invention, it is essential that the ethylene oxide be prevented from coming in direct contact with the adsorbent material so as to avoid decomposition of the toxic gas. Therefore, before the gaseous mixture to be purified is permitted to come in contact with the adsorbing material, which may be carbon or any other well known adsorbent, the ethylene oxide is converted to another compound which is adsorbed by the adsorbing agent but which is not decomposed thereby and does not react chemically therewith. I have found that hydrogen chloride or hydrochloric acid is a very effective material for this purpose, and a chemical reaction is believed to occur in accordance with the following equation:

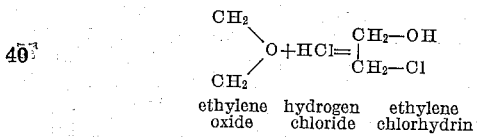

ethylene oxide + hydrogen chloride = ethylene chlorhydrin

The ethylene chlorhydrin formed in this way is readily adsorbed by the adsorbing agent and there is no danger during this adsorption of any decomposition of the ethylene chlorhydrin into toxic materials which will not be adsorbed.

Hydrogen chloride or hydrochloric acid may be used in purification apparatus, but it is generally impossible to use the acid alone in the canister of a gas mask. For this reason I have found it desirable to use, to produce the reaction, materials which will yield hydrogen chloride when in contact with the ethylene oxide.

I have found a number of chemical substances capable of yielding or releasing hydrogen chloride or hydrochloric acid for use in the reaction with ethylene oxide. Among these materials I have found especially suitable the complex acids formed by combination of heavy metal halides with hydrochloric acid. This type of material is described in the claims as a "heavy metal-hydrochloric acid". I have also found the complex salts comprising the heavy metal chlorides in combination with the alkali or alkaline earth chlorides or ammonium chloride available for this use. Mixtures of these complex acids and the complex salts may also be used. While I have described the use in my process of hydrochloric acid and hydrogen chloride, it is readily apparent that any other hydrogen halide might be used. Instead of the heavy metal chlorides and the other chlorides mentioned above, other halides might be used with success. In fact any substance capable of yielding a hydrogen halide or of halogenating the ethylene oxide may be used.

The reactive or converting materials are normally carried on porous bodies such as pumice, kieselguhr, silica gel, or any other porous carrier. Preferably, this carrier is a substance which will not cause decomposition of or react with the ethylene oxide, so that no carbon monoxide will be formed. The mixture should ordinarily be assembled so that the hydrogen chloride pressure of the reactive materials on the carrier is very low.

As specific examples of the reactive materials which yield hydrogen chloride or hydrochloric acid when in contact with ethylene oxide, the following may be mentioned. I have found the chlorides of the heavy metals, as iron and copper, to be especially desirable. Among the alkali metal salts, potassium and ammonium salts are most suitable. I have obtained very good results when using the ferric-hydrochloric-acid $(FeCl_4)H.2H_2O$. The potassium and ammonium salts of this acid, $(FeCl_5)K_2.H_2O$, and $(FeCl_5)(NH_4)_2.H_2O$ are also very desirable for this purpose.

In the preparation of the reactive material, two gram-molecules of the ferric-hydrochloric-acid are mixed with one gram molecule of the ammonium salt of this acid. This acid has not been isolated in the solid state yet, but, of course, a solution containing the two gram-molecules of the acid may be readily computed and added to the mixture.

The ammonium salt of cupric-hydrochloric-acid, $(CuCl_4)H_2$, which is a hypothetic acid, may also be used. This salt has the formula $CuCl_2.2NH_4Cl.2H_2O$, or it may also be written $(CuCl_4)(NH_4)_22H_2O$. This salt may be effectively used in a mixture with one gram-molecule of cupric chloride and one gram-molecule of hydrochloric acid.

When my invention is applied to a gas mask as shown in the drawing, I provide a canister of well known type comprising a casing 2 having at its top a threaded open projection 4 for connection to a mask and an open bottom provided with a screen 6 to retain the purifying material in the casing. The purifying material is divided into two layers 8 and 10 by an intermediate screen 12. The lower layer 8 is composed of a carrier impregnated with chemically reactive converting material as described above, while the upper layer 10 is of activated carbon or some similar adsorbent. The air enters at the bottom, and the ethylene oxide in passing through the lower layer is converted by the materials therein into ethylene chlorhydrin which is adsorbed by the carbon in the upper layer 10. A screen 14 may be provided above the carbon to prevent its escape from the canister.

I have found the following procedure desirable in the preparation of the chemically active materials for use in a gas mask or the like. Three gram-molecules of ferric chloride, $FeCl_3.4H_2O$, are dissolved in a relatively small quantity of water. Two gram-molecules of a concentrated solution of hydrochloric acid, and one gram-molecule of a concentrated solution of ammonium chloride, $NH_4Cl$, are added to the ferric chloride solution. Pumice stone in the form of particles of satisfactory size is immersed in the mixture and the mass is continuously stirred until all the liquid has been adsorbed in the pores of the pumice. The pumice serves as a carrier for the chemically reactive material which is used to convert the ethylene oxide into ethylene chlorhydrin, which latter toxic material is to be adsorbed in the adsorbing medium.

In the air purifier container, or in the canister of the gas mask, a layer of granular pumice treated in this manner and carrying the chemically reactive material, is combined with a layer of active carbon. In this way the air which is to be purified is first conducted through the pumice carrier, and then is led through the activated carbon adsorbing agent. The ethylene chlorhydrin produced in the first layer is entirely adsorbed in the adsorbing layer until the adsorptive power of the carbon is exhausted.

The amount of activated carbon to be used in the carrier or canister is determined by the adsorptive capacity of the carbon for ethylene chlorhydrin. The amount of activated carbon placed in the adsorbing layer is slightly less than that necessary to adsorb entirely the total amount of ethylene chlorhydrin which the quantity of hydrochloric acid in the converting agent is capable of converting from ethylene oxide. By thus proportioning the quantities of the substances forming the two layers in the canister, another important object of my invention is attained. When the active material in the canister or container is exhausted, there is still enough hydrochloric acid in the converting material to form ethylene chlorhydrin. This chlorinated substance has a very pronounced odor which is more readily discernible than the odor of the ethylene oxide which is to be removed from the purified air or gas. Therefore, the fact that the active materials are practically exhausted will be brought very forceably to the attention of the wearer of the gas mask, or of the occupants of a room protected by the purification apparatus, by the strong odor of the ethylene chlorhydrin. The users of the air are thus apprised of the failure of the purification apparatus and may take the proper steps to prevent serious or injurious consequences. This is a new step in the purification of air containing ethylene oxide, and forms a feature peculiar to my method.

It is pointed out that my invention is not limited to use in a gas mask or to air or other gas purifying apparatus. In its broadest aspects it consists in a method of removing ethylene oxide from gaseous mixtures. It is to be understood that my process is not limited to the particular procedure specified or to the use of any particular apparatus or any specific and definite chemical substances as reagents. It is a broad method, apparatus and composition for the purification of gaseous mixtures and the scope of the invention is to be determined solely from the appended claims.

What I claim is:

1. A process for the purification of air containing ethylene oxide for breathing purposes comprising the steps of first converting the ethylene oxide into a substance that is more stable and easily adsorbed in an adsorbing medium, and then adsorbing the product of the reaction in the said adsorbent material.

2. A process for the purification of air containing ethylene oxide for breathing purposes comprising the steps of converting the ethylene oxide into ethylene chlorhydrin and then adsorbing the ethylene chlorhydrin in an adsorbing medium.

3. A process for the purification of air containing ethylene oxide for breathing purposes comprising the steps of reacting the ethylene oxide with a substance capable of converting it into a substance which is more stable and easily adsorbed and has a more decided odor, and then passing the gas through an adsorbent material to remove the resulting product.

4. A process for the purification of air containing ethylene oxide for breathing purposes which consists in treating the air with a compound capable of yielding a hydrogen halide, thereby converting the ethylene oxide to a more stable and easily adsorbed compound, and then adsorbing the compound in an adsorbent material.

5. A process for the purification of air containing ethylene oxide for breathing purposes which comprises treating the ethylene oxide with a heavy metal-hydrochloric acid, thereby converting the ethylene oxide to ethylene chlorhydrin, and adsorbing the ethylene chlorhydrin in activated carbon.

6. A process of purifying a gaseous mixture containing ethylene oxide which comprises passing such mixture through a quantity of a heavy-metal hydrochloric acid, thereby converting the ethylene oxide into ethylene chlorhydrin, and adsorbing said ethylene chlorhydrin in a quantity of activated carbon, the quantity of such acid being sufficient to convert a somewhat greater amount of the ethylene oxide into ethylene chlorhydrin than the quantity of carbon is capable of adsorbing.

7. A device for purifying gaseous mixtures containing ethylene oxide, comprising a layer of material capable of converting the ethylene oxide into a more stable and easily adsorbed compound, and a layer of adsorbing material, the amount of converting material being sufficient to produce from said ethylene oxide an amount of ethylene chlorhydrin somewhat greater than the amount said adsorbing material is capable of adsorbing.

8. A device for purifying gaseous mixtures containing ethylene oxide, comprising a casing having an inlet and an outlet, a granular porous carrier material impregnated with a quantity of complex acids of heavy-metal chlorides which are capable of yielding hydrochloric acid in the inlet side of said casing, and a quantity of activated carbon in the outlet side of said casing, the quantity of acids being sufficient to convert a somewhat greater amount of said ethylene oxide into ethylene chlorhydrin than the quantity of carbon can adsorb.

GERHARD KARL EMIL
HEINRICH STAMPE.